United States Patent [19]
Ushiro et al.

[11] Patent Number: 5,144,491
[45] Date of Patent: Sep. 1, 1992

[54] APPARATUS WITH LENS CONTROL DEVICE

[75] Inventors: Tatsuzo Ushiro, Saitama; Naoya Kaneda, Kanagawa; Hiroyuki Wada, Kanagawa; Masahide Hirasawa, Kanagawa, all of Japan

[73] Assignee: Canon Kabushiki Kaisha, Tokyo, Japan

[21] Appl. No.: 510,973

[22] Filed: Apr. 19, 1990

[30] Foreign Application Priority Data

Apr. 24, 1989 [JP] Japan .................................. 1-103786
May 30, 1989 [JP] Japan .................................. 1-136599
May 30, 1989 [JP] Japan .................................. 1-136600

[51] Int. Cl.$^5$ ............................................. G02B 15/00
[52] U.S. Cl. .................................... 359/697; 359/698; 359/767; 354/400; 358/225
[58] Field of Search ............... 359/694, 676, 823, 696, 359/697, 698, 695, 684; 354/400, 402, 435, 446, 452, 187, 195.12; 358/225

[56] References Cited

U.S. PATENT DOCUMENTS

| | | | |
|---|---|---|---|
| 4,161,756 | 7/1979 | Thomas | 359/696 |
| 4,885,600 | 12/1989 | Iwasa et al. | 354/400 |
| 4,920,369 | 4/1990 | Kaneda et al. | 354/400 |
| 4,950,054 | 8/1990 | Wada et al. | 359/684 |
| 4,975,724 | 12/1990 | Hirasawa et al. | 354/400 |
| 5,016,993 | 5/1991 | Akitake | 359/696 |

Primary Examiner—Loha Ben
Attorney, Agent, or Firm—Robin, Blecker, Daley & Driscoll

[57] ABSTRACT

An optical apparatus comprises a first lens to be used for changing a magnifying power; a second lens to be used for focus adjustment and also for compensation required when the magnifying power is varied; a focus detecting circuit for detecting an in-focus state; a first control circuit for driving the second lens to an in-focus position on the basis of information obtained by the focus detecting circuit; a detecting circuit for detecting the position of the second lens; and a second control circuit for driving the second lens to a normal focus adjustable position after driving the second lens to a reset position for the purpose of enabling the detecting circuit to perform a detecting action. The second control circuit is arranged to drive the second lens from the reset position to the focus adjustable position at a higher speed than the driving speed set by the first control circuit.

25 Claims, 11 Drawing Sheets

APPARATUS WITH LENS CONTROL DEVICE

BACKGROUND OF THE INVENTION

1. Field of the Invention

This invention relates to an apparatus arranged to control a lens for varying the magnifying power of the lens or for focusing the lens.

2. Description of the Related Art

In a zoom lens of the kind having a focusing lens group disposed rearwardly of a (power) variator lens group, the position of the focusing lens group not only varies according to a distance to an object to be photographed (hereinafter referred to as object distance) but also varies with the position of the variator lens group, i.e., a magnifying power. In the case of a zoom lens of the kind having lens groups differently arranged in the order of a focusing lens group—a variator lens group—a compensator lens group—a relay lens group as viewed from the front side of the lens, the magnifying power of the lens can be changed while keeping it in an in-focus state by just varying the relative distances of the variator lens group and the compensator lens group in the direction of the optical axis of the lens, for example, by rotating a cam tube without changing the position of the focusing lens group. Unlike the zoom lens of that kind, in the zoom lens of the kind having focusing lens group disposed rearwardly of the variator lens group, the position of the focusing lens group must be changed according to the position of the variator lens group. In cases where shooting is made while changing the magnifying power of the lens, like in the case of a video camera, the picture must be prevented from blurring. The position of the focusing lens group must be continuously adjusted to changes taking place in the object distance through a complex process of lens position control.

A method for such zoom lens position control has been known, for example, from Japanese Laid-Open Patent Application No. SHO 62-296110.

This lens position control method is as follows: Referring to FIG. 4 of the accompanying drawings, the range of zoom positions of the variator lens group (on the axis of abscissa) from a telephoto end T to a wide-angle end W is equally divided into a plurality of zones. The locus of the focusing lens group for every one of these divided zones is stored in a memory. When the position of the variator lens group is shifted, information on the locus stored is taken out from the memory according to information on the position of the variator lens group. Then, the focusing lens group is moved along this locus.

Under the above-stated control, the information on the position of the variator lens group is detected by a position detecting means such as an encoder. Further, the information on the position of the focusing lens group which is arranged to be driven by means of a pulse motor is obtained by counting the number of the pulse motor driving pulses With the focusing lens group driven within a normal operable range of the pulse motor, the position of the focusing lens group is unconditionally determined by counting the number of the pulse motor driving pulses.

In the lens position control method, the position of the focusing lens group is controlled by determining whether or not the lens is out of focus in addition to the control performed according to the locus information obtained from the memory. In a suitable focus determining method, the light of the object is received through the zoom lens by a light receiving means which is composed of photoelectric conversion elements; and the focusing lens group is controlled in such a way as to bring the high-frequency component or the sharpness of an image signal output from the light receiving means to the peak value thereof, because: In cases where the object distance is externally measured by means of infrared rays or the like by the so-called active type method, the zoom lens in which the position of the focusing lens group varies with the zooming position of the lens (the position of the variator lens group) necessitates the positions of the focusing lens group corresponding to all the zooming positions of the lens to be stored in the memory, if the lens position control must be finely carried out. In that instance, the accuracy of distance measurement, the pitch of the divided areas, the zooming positions and the pitch of the focusing lens group must be very finely arranged. The necessary amount of information to be stored within a system increases to a great degree, thus necessitating the use of a memory of a large storage capacity.

Whereas, the focusing method of using an image signal does not necessitate use of a memory except for a zooming action. This method is capable of bringing the lens to an in-focus position without following the locus for every one of the object distances as shown in FIG. 4.

However, an arrangement to drive and control the focusing lens group in search of an in-focus position during a zooming process solely in accordance with the above-stated focusing method of using the image signal presents the following problem: In the case of a video camera, for instance, images are picked up at intervals of 1/60 sec (the NTSC system). In such a case, the speed of the focusing action is too slow for image sensing. To solve this problem, the focusing lens group is controlled by a focusing system by driving and controlling the lens group in accordance with the above-stated locus which is stored for every one of the plurality of divided zones.

More specific description of this is as follows: The zooming positions of the lens are divided into a plurality of zones as shown in FIG. 4. Within a range of near object distances, the loci of the focusing lens group relative to the object distance do not show much difference in the inclination of their curves. Therefore, the focusing lens group positions (the axis of ordinate of FIG. 4) are divided into a plurality of zones. The shifting speed of the focusing lens group is representatively determined for each of the divided zones and is stored in a memory. Then, the focusing lens group is driven at one of different representative speeds according to the information on the variator lens group position. Meanwhile, the blurred degree of an image thus obtained is periodically examined. When the blurred degree is found to have exceeded a given degree, the driving action on the focusing lens group at the representative speed is brought to a stop. Then, the focusing lens group is driven and shifted in the direction of reducing the degree of blur by increasing or decreasing the lens shifting speed. After an in-focus state is obtained, the lens group is again driven at the representative speed. The focusing action is thus finely performed without blurring the image by thus shifting the focusing lens group in close proximity to the locus. Further, before commencement of a zooming action, the focusing system is operated to bring the focusing lens group into an in-focus position, for example, when the power supply of the camera is switched on.

Therefore, this lens position control device is capable of efficiently controlling the focusing lens group with a memory of a very small storage capacity. The lens, therefore, can be driven and controlled with a very simple system.

In the case of the lens position control device which is arranged in this manner, on the other hand, the information on the position of the focusing lens group is obtained by counting the driving pulses of a pulse motor, if the focusing lens group is arranged to be driven by the pulse motor. Therefore, the focusing lens group must be in a position which is usable as a reference point for the pulse count. Information on the focusing lens group position is then obtained from a number of pulses counted when the focusing lens group is shifted to a certain position from the above-stated reference point. One of the divided zones (or areas) stored in the memory is then determined to be applicable from information on the focusing lens position and information on the variator lens group position. An applicable representative speed is then determined for a zooming action.

The focusing lens group can be set in a reference position (hereinafter referred to as a reset position) in varied manners, including: A method of bringing the focusing lens group back to a reset position when the power supply is switched off; and a method of clearing or resetting a focusing or zooming position storing memory after bringing the focusing lens group to the reset position when the power supply is switched on.

However, if the reset position which is to be used as reference for information on the position of the focusing lens group is set within a normal focusing lens group driving range, the focusing lens group might be caused to hit the reset position by a temperature error or a focusing error. This brings about some inconvenience in terms of load and system arrangement. In view of this, the reset position is set to the outside of the operating range of the focusing lens group.

Hence, when the power supply is switched on, the focusing lens group which is located in the reset position outside the operating range must be shifted from this position at the start of an automatic focusing action. As a result, a period of time required before an in-focus state is attained becomes long. In the case of a focusing method of detecting the peak of the high-frequency component of an image signal by using the image signal, in particular, the focusing speed becomes much slower than the focusing system of the external distance measuring type, because: In that case, if the focusing speed is too fast, the focusing lens group might be brought to a stop after overshooting the above-stated peak position. Further, since the reset position is set within an area beyond the infinity distance point of the focusing lens group shifting locus, the lens is in an extremely blurring state when it is in the reset position. This also causes the slow focusing speed.

Further, in cases where a lens state detecting device and a microcomputer or the like are used in combination for enhancing the operating efficiency of an automatic focusing system or the like by carrying out complex and precise lens position control, the resolving power of the above-stated lens state detecting device must be increased also. Such a device is typically represented by a lens position detecting device. Heretofore, the lens position detecting device of the kind having a high resolving power has often employed an encoder which is arranged to generate a digital signal in synchronism with the shift of the lens position.

Encoders which generate digital signals in the above-stated manner can be roughly classified into two kinds. One is called an absolute type encoder which is arranged to generate its own intrinsic signal corresponding to the position of the lens. The other is called an increment type encoder which is arranged to produce a number of pulses in proportion to an extent to which the position of the lens is shifted. In most cases, the increment type encoder is used for consumer appliances on account of the cost and size thereof.

However, with the conventional apparatus arranged in the above-stated manner, the use of the increment type encoder necessitates inclusion of a counter for counting the pulses of the encoder in the lens position control device which consists of a microcomputer, etc. Then, in order to detect an absolute position of the lens, the following operation processes are indispensable: The lens is shifted to a given reset position, for example, immediately after the power supply is switched on; and then the count position of the counter must be set at a value corresponding to the reset position of the lens before the counter is allowed to begin to count.

The position of the lens thus must be shifted always before the above-stated reset action when, for example, the power supply is switched on. This makes it impossible, for example, to have the apparatus in a standby state for shooting by switching the power supply off after setting the angle of view and a focal point.

Further, a method of forcedly shifting a phototaking lens simply inward when the power supply is turned off has been proposed by U.S. Pat. No. 4,827,296. However, the problem that an excessively long period of time is necessary before commencement of a normal operation after the power supply is switched on is hardly solvable by the method proposed.

SUMMARY OF THE INVENTION

It is an object of this invention to provide an apparatus having a lens control device which is capable of speedily bringing the lens to an in-focus position by shifting the lens from its initial position to the in-focus position first at a high speed and, after that, at a normal focusing speed.

It is another object of the invention to provide an apparatus having a lens control device which enables the apparatus to speedily perform a photo-taking operation by forcedly shifting the lens to a given position when a power supply is turned off so that information on the position of the lens can be obtained without resetting the lens when the power supply is turned on next time.

It is a further object of the invention to provide an apparatus having a lens control device which is arranged to store information on the position of the lens and to bring the lens back to the stored position after the lens is reset so that the necessity of readjusting the angle of view and the focal point of the lens after the resetting action can be obviated.

These and further objects and features of the invention will become apparent from the following detailed description of embodiments thereof taken in connection with the accompanying drawings.

DETAILED DESCRIPTION OF THE PREFERRED EMBODIMENT

Figure 2:
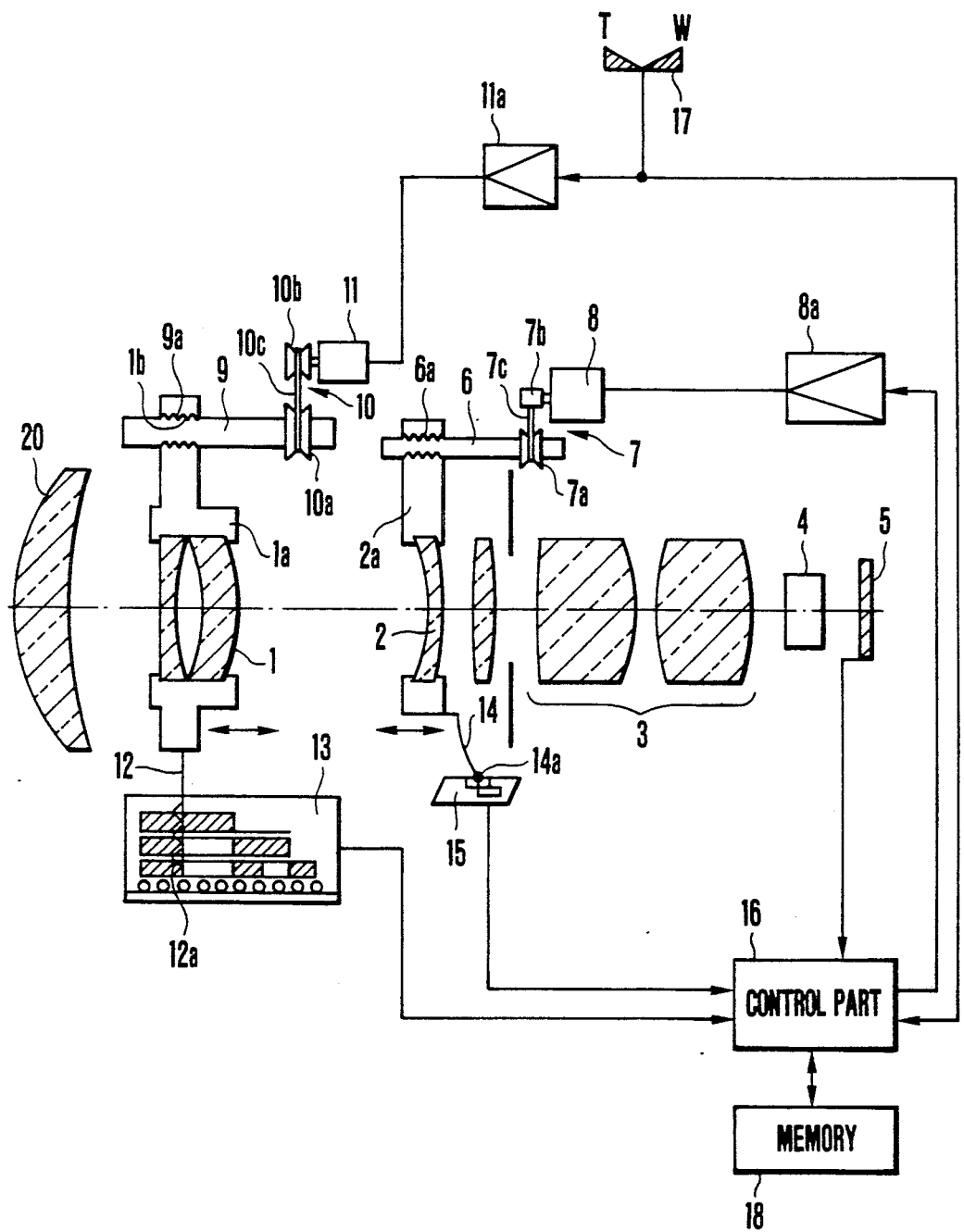
FIG. 2 is a block diagram showing the arrangement of the zoom lens position control device of the first embodiment.

First Embodiment: FIG. 2 shows in a block diagram a lens position control device which is arranged as a first embodiment of this invention to control the position of a zoom lens. In this case, the invention is applied to a video camera.

Referring to FIG. 2, a variator lens 1 changes the image magnifying power of the zoom lens. A focusing lens 2 is arranged not only to perform a focusing action but also to perform the function of a compensator lens for changes taking place in the position of the variator lens 1. A so-called relay lens 3 is arranged to serve as an image forming lens. The variator lens 1, the focusing lens 2, the relay lens 3 and an optical low-pass filter 4 are arranged to form the zoom lens in conjunction with a fixed lens 20 which is fixedly disposed in the forwardmost position within the zoom lens. The zoom lens thus forms through the optical low-pass filter 4 an object image on an image sensing means 5 which consists of a CCD, etc.

A guide bar 9 extends along an optical axis. The guide bar 9 has a pulley 10a secured to one end of it and a screw part 9a on the other end. The guide bar 9 is carried by a fixed tube part (not shown) to be rotatable but to be not axially movable. The lens position control device includes a power varying driving motor 11 (hereinafter referred to as a zoom motor). A reduction mechanism 10 is arranged to connect the pulley 10b of the zoom motor 11 to the pulley 10a via a belt 10c. The rotation of the zoom motor 11 is transmitted to the guide bar 9 via the reduction mechanism 10. The screw part 9a of the guide bar 9 is screwed into a screw hole 1b formed in a support frame 1a which is arranged to carry the variator lens 1. With the zoom motor 11 driven to rotate, the guide bar 9 is rotated to vary the magnifying power of the lens by shifting the position of the variator lens 1 in the direction of the optical axis.

A brush 12 is secured to the support frame 1a of the variator lens 1. The brush 12 is provided with a conductive brush part 12a which is formed at the fore end part of the brush 12. An encoder pattern is formed on an encoder substrate 13. The position of the variator lens 1 is encoded as an absolute value when the conductive brush part 12a comes into contact with the encoder pattern. The variator lens position information thus obtained is supplied to a control part 16. The encoder pattern is arranged to permit detection of each of 16 zones in the form of four bits. A zoom switch 17 is arranged to supply a signal to a zoom motor driver 11a for driving toward a telephoto end T or toward a wide-angle end W. In response to this signal, the zoom motor driver 11a causes the zoom motor 11 to rotate forward or backward. The switch 17 also supplies a lens shifting direction signal to the control part 16.

The focusing lens 2 is arranged to be carried by a support frame 2a in a manner similar to the variator lens 1. The support frame 2a is screwed to the screw part 6a of a guide bar 6. A transmission mechanism 7 is formed jointly by a pulley 7a which is secured to the guide bar 6, a motor pulley 7b and a belt 7c which straddles the pulleys 7a and 7b. The rotation of a focusing lens driving pulse motor 8 is transmitted to the guide bar 6 via the transmission mechanism 7. This causes the position of the focusing lens 2 to be shifted along the optical axis for focusing. Further, in the transmission mechanism 7, a gear ratio or a pulley diameter ratio is set in such a way as to define the pitch of blurred degree of the image.

Figure 3:
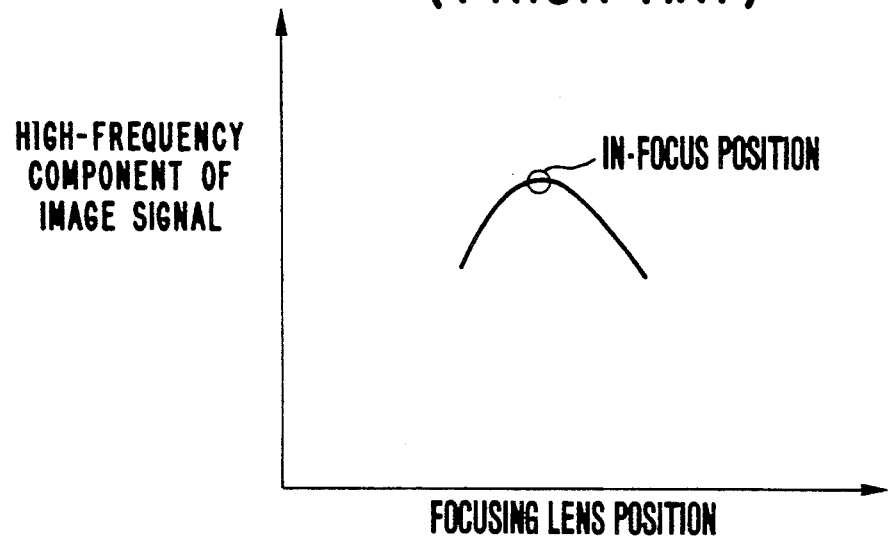
FIG. 3 shows changes in the high-frequency component of an image signal in relation to the position of a focusing lens.

A normal focusing action is performed on the basis of image information from the image sensing means 5 by the control part 16 which is arranged to perform system control and an image processing action. As shown in FIG. 3, the high-frequency component of the image information varies with the position of the focusing lens 2. Therefore, the position of the focusing lens 2 is shifted by driving the pulse motor 8 in such a way as to sharply obtain the peak of the high-frequency component. The pulse motor 8 is driven by driving pulses supplied from the control part 16 to the pulse motor driver 8a. The pulses thus supplied are counted by a pulse counter which is disposed within the control part 16. The focus may be detected through the high-frequency component of the image signal either according to the above-stated sharpness or according to the gradient of a light-and-dark changing part.

The support frame 2a of the focusing lens 2 has a brush 14 mounted on one side thereof. A reset substrate 15 on which resetting positions are patternized is mounted on the opposite side of the frame 2a. When the position of the focusing lens 2 is located outside the range of the operating positions thereof, the conductive brush part 14a of the brush 14 is in contact with the pattern of the reset substrate 15. With the conductive brush part 14a coming into contact with the pattern, the rest substrate 15 supplies a focusing lens resetting signal to the control part 16.

Figure 4:
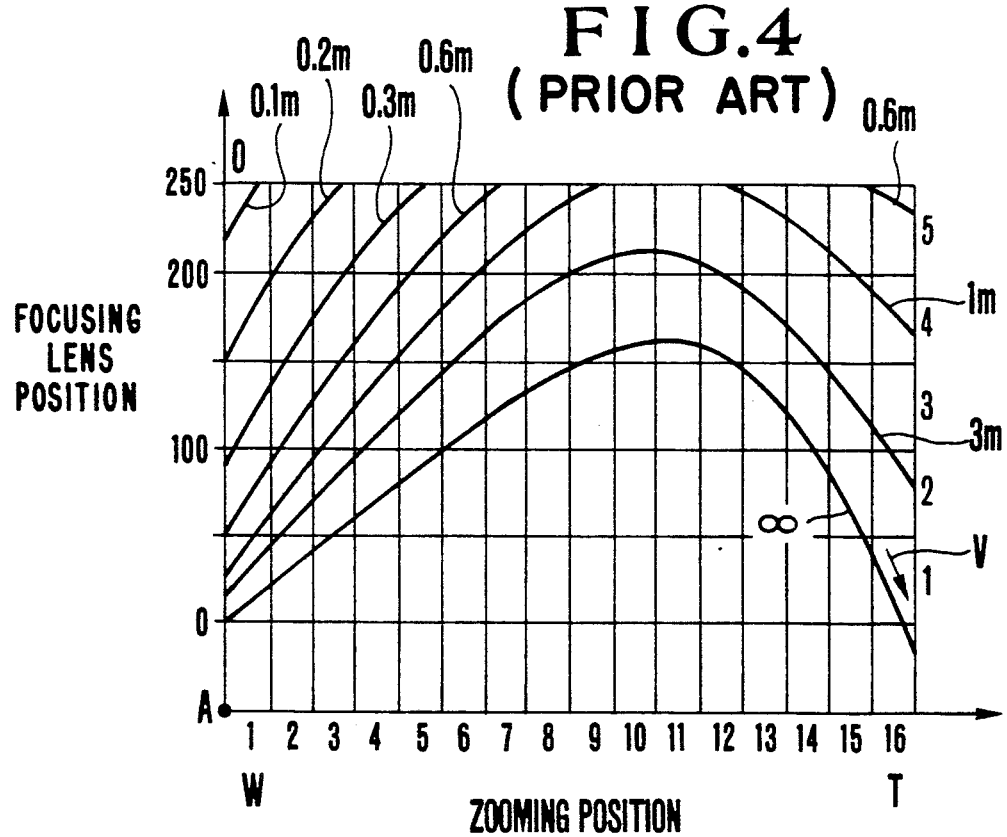
FIG. 4 shows the loci of focusing lens positions which vary with a distance to a photo-taking object in relation to the zooming position of the zoom lens.

For a zooming action, the variator lens 1 and the focusing lens 2 are driven and controlled in the same manner as the conventional method described in the foregoing. For example, the focusing lens 2 is driven at one of the representative speeds determined for the divided zones which are set in a matrix like manner as shown in FIG. 4. At the same time, the focusing means which detects the focused state of the lens through the high-frequency component of the image performs a focusing action.

Since the zoom encoder substrate 13 is arranged to be capable of detecting 16 zones, the zooming range is divided into 16 zooming positions in the case of this (first) embodiment. Meanwhile, the operating range of the focusing lens is divided into five zones. This gives a total of 80 divided zones. Representative lens shifting speeds are determined for the 80 zones respectively and are stored in a memory 18.

In performing the zooming action, when the position of the zoom switch 17 is shifted to one side T or the other side W, the control part 16 determines an applicable zone from among the divided zones according to information on the positions of the focusing and variator lenses as well as information on the zooming direction selected by the zoom switch 17. The control part 16 then reads the representative speed of the zone from the memory 18.

With the lens position control device arranged in this manner, the focusing lens must be shifted at a higher speed during the zooming action than during a normal focusing action, because of the process of reading an object image. Further, as indicated by an arrow V in FIG. 4, the speed for the zone near the infinity object distance on the telephoto side T is the fastest speed. In order to make the focusing action possible under the zooming action within such a fast speed zone, the focusing action must be performed at a higher speed than that of the normal focusing. This highest representative speed V is adopted as an initial focusing speed.

Referring again to FIG. 4, in the case of this embodiment, a point A is arranged to be the reset position of the focusing lens 2. The focusing lens position obtained for the infinity object distance within each of the zooming zones is stored in the memory 18. Then, in shifting the focusing lens 2 from the reset position to an in-focus position, the control part 16 causes the focusing lens 2 to be driven first at the initial focusing speed V or at a speed higher than that until the focusing lens 2 comes to its position for the infinity object distance within the applicable zooming zone. After that, the control part 16 allows the focusing lens 2 to be driven at a normal focusing speed. The counter which counts pulses for the focusing lens position is arranged to be reset at the reset position and is allowed to start counting the driving pulses at the beginning of the focusing lens shifting action.

Figure 1:
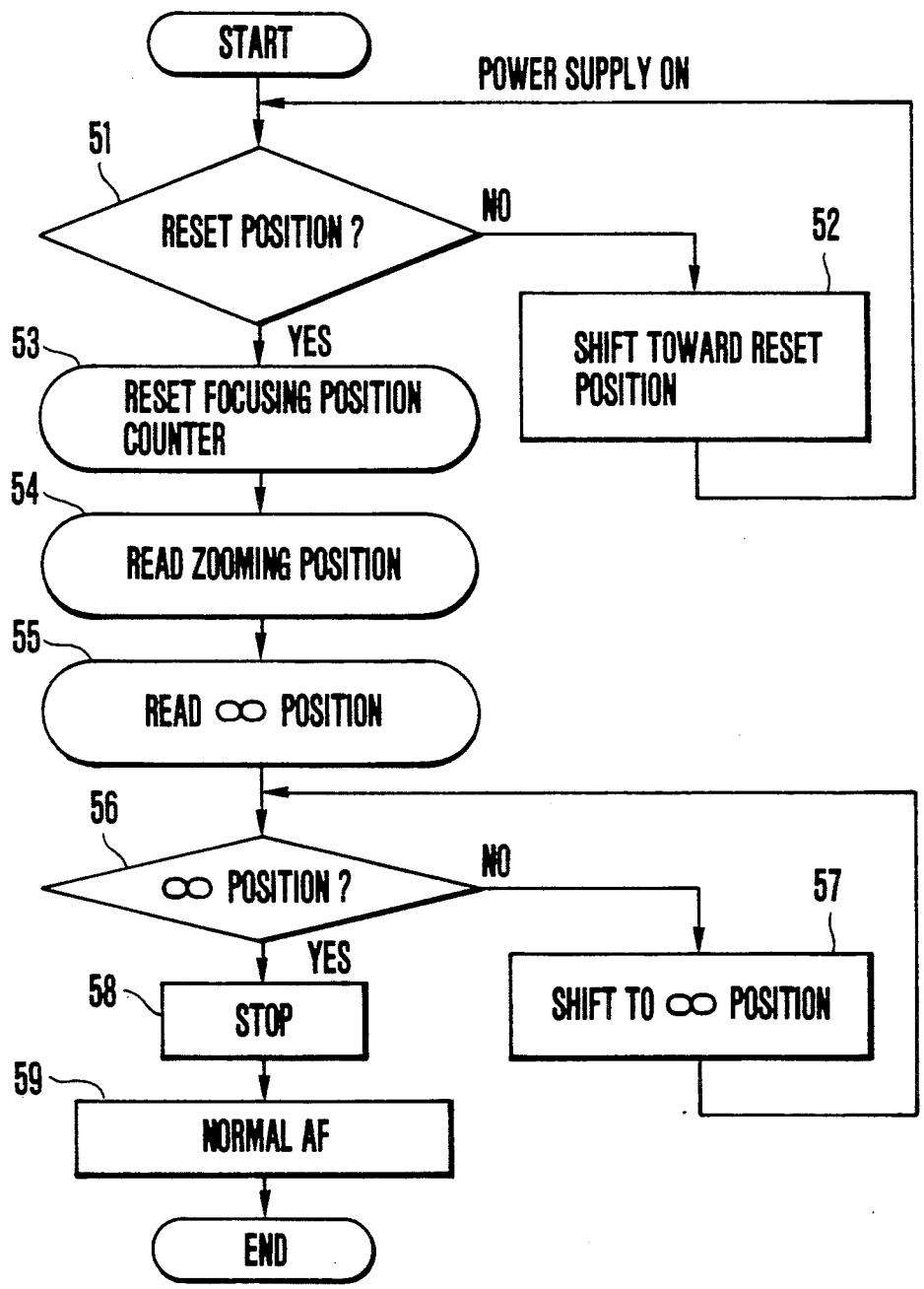
FIG. 1 is a flow chart showing the operation of a zoom lens position control device which is arranged according to this invention as a first embodiment thereof.

The driving control performed by the control part 16 in shifting the focusing lens 2 from the reset position to the in-focus position is described below with reference to FIG. 1 which is a flow chart:

At a step 51 (hereinafter the word "step" is abbreviated as S and prefixed to step numbers): When the power supply of the video camera is turned on, the signal from the reset substrate 15 is checked to find if the focusing lens 2 is in the reset position A. If not, the flow of operation comes to a step 52. S52: the focusing lens 2 is forcedly shifted to the reset position. S53: With the focusing lens 2 set in the reset position, the pulse counter which is arranged to count the focusing lens positions is reset to a zero position. S54: The position of the variator lens 1 is detected through the zoom encoder substrate 13. S55: Information on the position of the focusing lens 2 corresponding to the infinity object distance is read from the memory 18 according to the detected position of the variator lens 1. S56: A check is made to see if the focusing lens 2 is in a position for the infinity object distance. If not, the flow comes to a step 57. S57: The focusing lens 2 is driven at the initial speed V. S58: With the focusing lens 2 thus shifted at the initial focusing speed V, when it reaches the position for the infinity object distance, i.e., when the counted value of the pulse counter reaches a value corresponding to the infinity distance, the focusing lens 2 is stopped from being driven at the initial focusing speed V. S59: The focusing lens 2 is driven and controlled at the normal focusing speed which is lower than the initial focusing speed V. The initial focusing action comes to an end with the lens focused on a desired photo-taking object. Further, during the process of driving the focusing lens 2 to the initial in-focus position, any magnifying power varying action is inhibited.

In shifting the focusing lens 2 from the reset position to an in-focus position with the power supply of the camera turned on, the focusing lens 2 is first driven to the infinity object distance position at the highest of the speeds set for driving the focusing lens 2. After that, the lens 2 is driven at the normal focusing speed. Therefore, the focusing action can be speedily carried out.

As mentioned above, the focusing lens is shifted at a very high speed for the initial focusing action. Therefore, in the case of the so-called "camcorder", it is preferable to avoid any noise that might result from the high driving speed by muting the audio signal of a microphone or by inhibiting a change to a recording mode.

In the case of the first embodiment described above, the focusing lens 2 is driven for initial focusing at the speed V which is the highest of the focusing lens shifting speed set for a zooming action. However, the initial focusing action may be performed on the focusing lens 2 at a speed higher than the speed V.

Further, while the focusing lens is arranged to be shifted to the infinity object distance position at the high speed in the case of the first embodiment, this arrangement may be changed to shift the focusing lens to some other desired distance position. For instance, the focusing lens may be shifted to a position for an object distance of 5 m instead of the infinity distance.

The embodiment may be modified in the following manner: Various object distances may be selected including, for example, 0.3 m, 1 m, 3 m, 5 m and the infinity distance. The focusing lens positions corresponding to these object distances are stored in a memory for each of the zooming zones. In addition to that, information on an object distance measured by a distance measuring device is supplied also to the control part. This enables the lens position control device to begin the initial focusing action from an object distance position most apposite to the measured distance among other positions stored.

Further, in another embodiment of the invention, the variator lens 1 is arranged to be driven by a pulse motor, like the focusing lens 2, so that the variator lens position can be detected by counting the number of driving pulses. Then, the variator lens must be shifted back to its reset position when the power supply is turned on. In this instance also, the variator lens can be shifted speedily back to, for example, its wide-angle end position W (FIG. 4) by driving it at a speed faster than a normal magnifying power varying speed.

While the first embodiment described in the foregoing is arranged to use a pulse motor for driving the focusing lens, the initial focusing action from the reset position can be likewise carried out by a combination of, for example, an incremental encoder and an ordinary DC motor. In that instance, the speed of the DC motor is normally pulse-width-controlled and is increased to a high speed by setting it at its 100% duty ratio at the time of initial focusing.

The arrangement of the focusing lens may be changed into one of the following two types: In one type, the focusing lens may be included in the image forming lens system. In the other type, like in the case of a lens arrangement where the foremost lens is shifted along a certain locus at the time of a power varying action, the whole length of the lens becomes shorter in the wide-angle end position W for better storability and portability. In the case of the latter type, the focusing lens is returned to its reset position before the power supply is turned off. If the zoom lens is in that type, the zoom lens is in focus in the infinity object distance position on the side W when the power supply is turned on. However, if a specific power varying position is designated by means of a zoom presetting switch or the like, the lens position can be designated and shifted to the preset power varying position from the reset position. In this instance, provision of a back-up power supply enables the memory to store the variator lens position and the focusing lens position obtained when the power supply is turned off. Then, when the power supply is turned on, the variator lens and the focusing lens can be promptly brought back to their positions.

As described in the foregoing, in accordance with the arrangement of the first embodiment, the second lens group can be accurately and promptly shifted to an in-focus position without overshooting before a magnifying power varying operation. With the initial position of the second lens group set beyond the infinity distance position, the camera can be allowed to smoothly begin the automatic focusing action by quickly passing the lens group through the trans-infinity distance zone in which no in-focus state is attainable.

Figure 5:
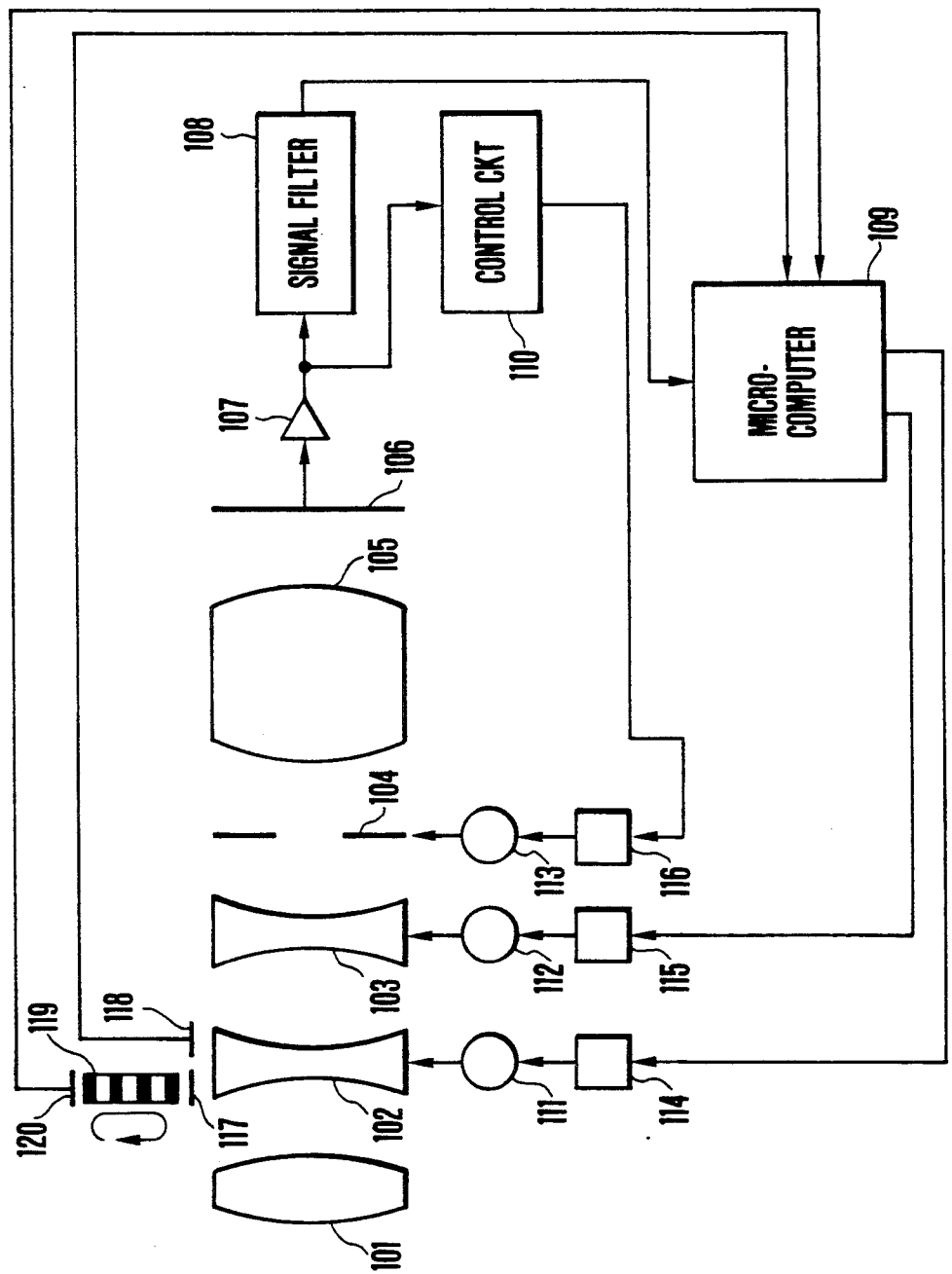
FIG. 5 is a block diagram showing the lens position control device of a camera arranged according to this invention as a second embodiment thereof.

Second Embodiment: FIG. 5 is a block diagram showing a lens position control device of a camera arranged according to this invention as a second embodiment thereof. Referring to FIG. 5, a first lens group 101 is arranged to be stationary. A second lens group (hereinafter referred to as V lens) 102 is arranged to vary the magnifying power of the lens. A third lens group (hereinafter referred to as C lens) 103 is provided for the purpose of correcting a focal plane in varying the magnifying power and also for focus adjustment. The illustration includes an iris 104; an image forming lens group 105; an image sensing plane 106 of an image sensor which is made of a CCD or the like; an amplifying circuit 107 which is arranged to amplify the output of the image sensor; a signal filter 108; a microcomputer 109; a control circuit 110 which is arranged to determine, on the basis of the output of the amplifying circuit 107, the luminance of an image projected on the image sensing plane and to control an opening or closing action on the iris 104; drive sources 111, 112 and 113 which are arranged to drive the V lens 102, the C lens 103 and the iris 104 respectively; drivers 114, 115 and 116 which are arranged to drive the drive sources 111 to 113 respectively; a gear 117 which rotates accordingly as the V lens 102 is moved; a detector 118 which is arranged to produce a signal when the V lens 102 is in a given reference position; a pulse generator 119 which is arranged to rotate according to the rotation of the gear 117 and to produce pulses at equal intervals for the rotation; and a pulse detector 120 which is arranged to detect the pulses generated from the pulse generator 119 and to transmit the result of detection to the microcomputer 109.

Figure 6:
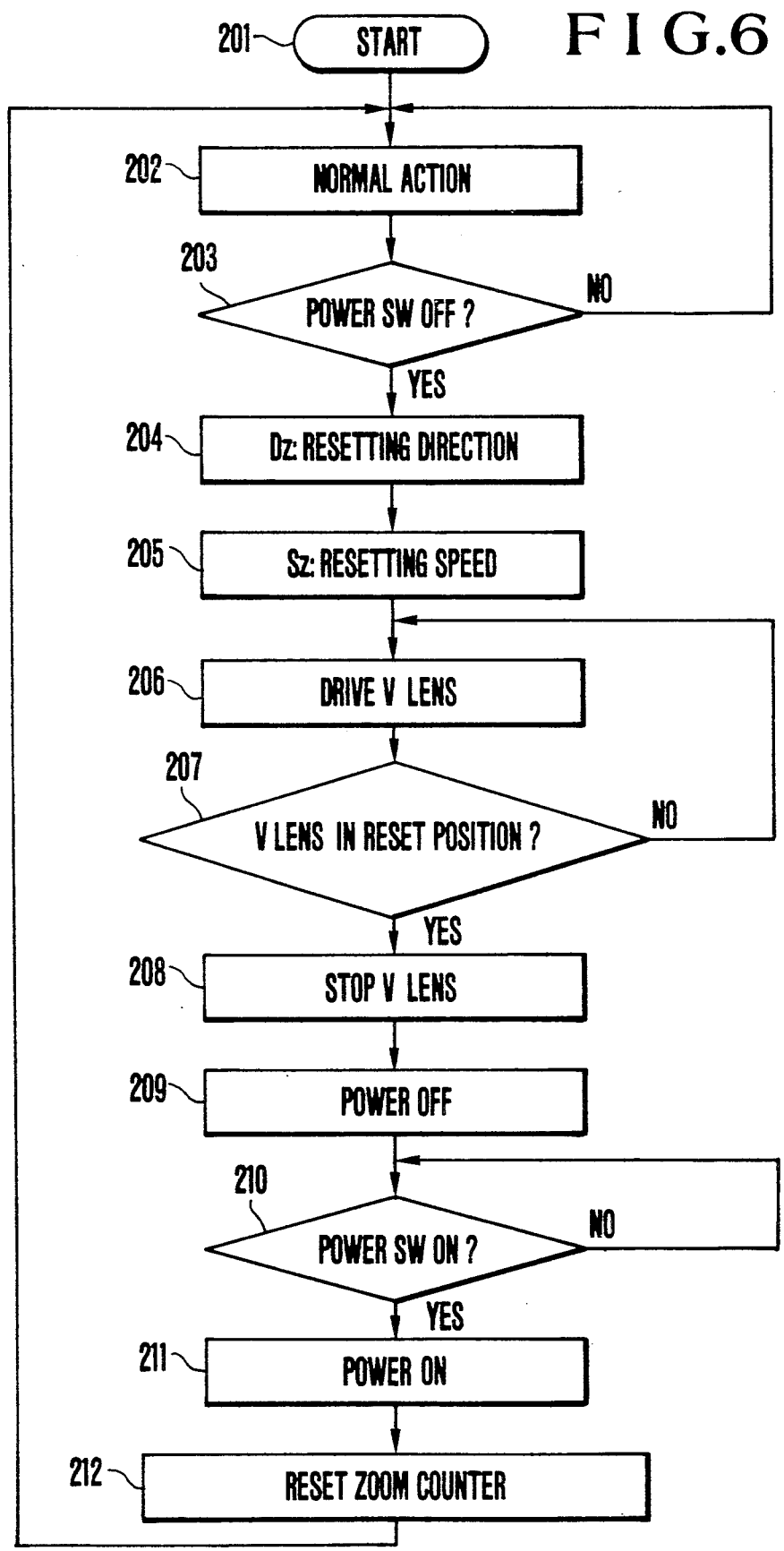
FIG. 6 is a flow chart showing the operation of the second embodiment.

FIG. 6 is a flow chart showing a program to be executed within the microcomputer 109 for the purpose of practicing the second embodiment. Referring to FIG. 6, the program begins at a step 201. At a step 202: The normal operation of the camera is performed including an automatic focusing (AF) action and a zooming action, etc. Step 203: The power supply of the camera is checked to see if it has been switched off. Step 204: The direction in which the V lens 102 is to be shifted is set toward the reset position of the V lens. Step 205: The speed at which the V lens 102 is to be shifted for resetting it is set. Step 206: The position of the V lens 102 is driven at the set speed. Step 207: A check is made to see if the V lens 102 has reached the reset position. If so, the flow of the program comes to a step 208. Step 208: The V lens 102 is brought to a stop. Step 209: The power supply is turned off. Step 210: A check is made to see if the power supply switch of the camera has been turned on. Step 211: The power supply is turned on. Step 212: The counted value of a zoom position detecting counter which is disposed within the microcomputer 109 is set at a value corresponding to the reset position of the V lens 102.

The following further describes the operation of the second embodiment on the basis of the flow of the program shown in FIG. 6: After the program starts at the step 201, the microcomputer 109 continuously allows the camera to perform the normal operation including the AF and zooming actions at the step 202 as long as the power supply switch is not turned off. When the power supply switch is found to be turned off at the step 203, the V lens shifting direction is set toward the resetting position at the step 204. The speed at which the V lens 102 is to be shifted to the reset position is set at a suitable value at the step 205. After that, at the step 206, the V lens 102 is driven at the set speed. At the step 207, the V lens 102 continues to be shifted until confirmation of the arrival of the V lens at the reset position. At the step 207: The output of the detector 118 is checked for the arrival of the V lens 102 at the reset position. Upon arrival of the V lens 102 at the reset position, the V lens 102 is brought to a stop at the step 208. Then, the power supply is cut off at the step 209.

After the power supply is cut off, the flow of the program comes to the step 210 to wait for re-closing of the power supply switch. When the power supply switch is closed, the flow immediately comes to the step 211 to turn on the power supply to applicable circuits. Then, the zoom counter of the microcomputer 109 is set at a counted value corresponding to the reset position. After that, the normal operation of the camera begins.

The reset process described above enables the camera to promptly begin its normal operation by shortening the resetting time required after the power supply is turned on.

The power supply switch for the electrical system of FIG. 5 is either under the control of a microcomputer which is not shown and is other than the microcomputer 109 or under the control of a logic circuit in the case of the conventional device. Whereas, the arrangement to send a control signal from the microcomputer 109 to a power supply control device enables the camera to embody this invention without recourse to any additional part.

Figure 7:
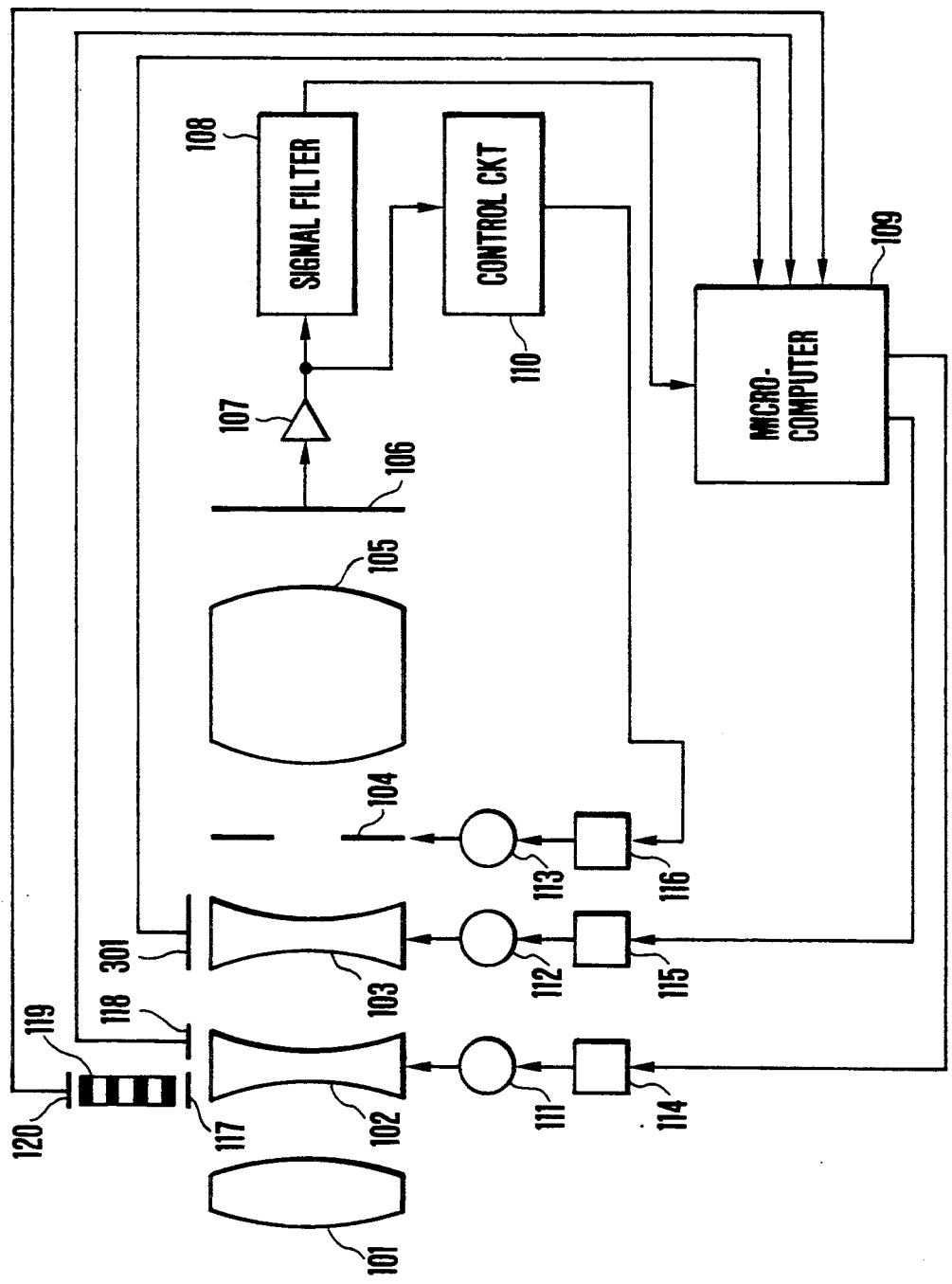
FIG. 7 is a block diagram showing the arrangement of a third embodiment of the invention.
Figure 8:
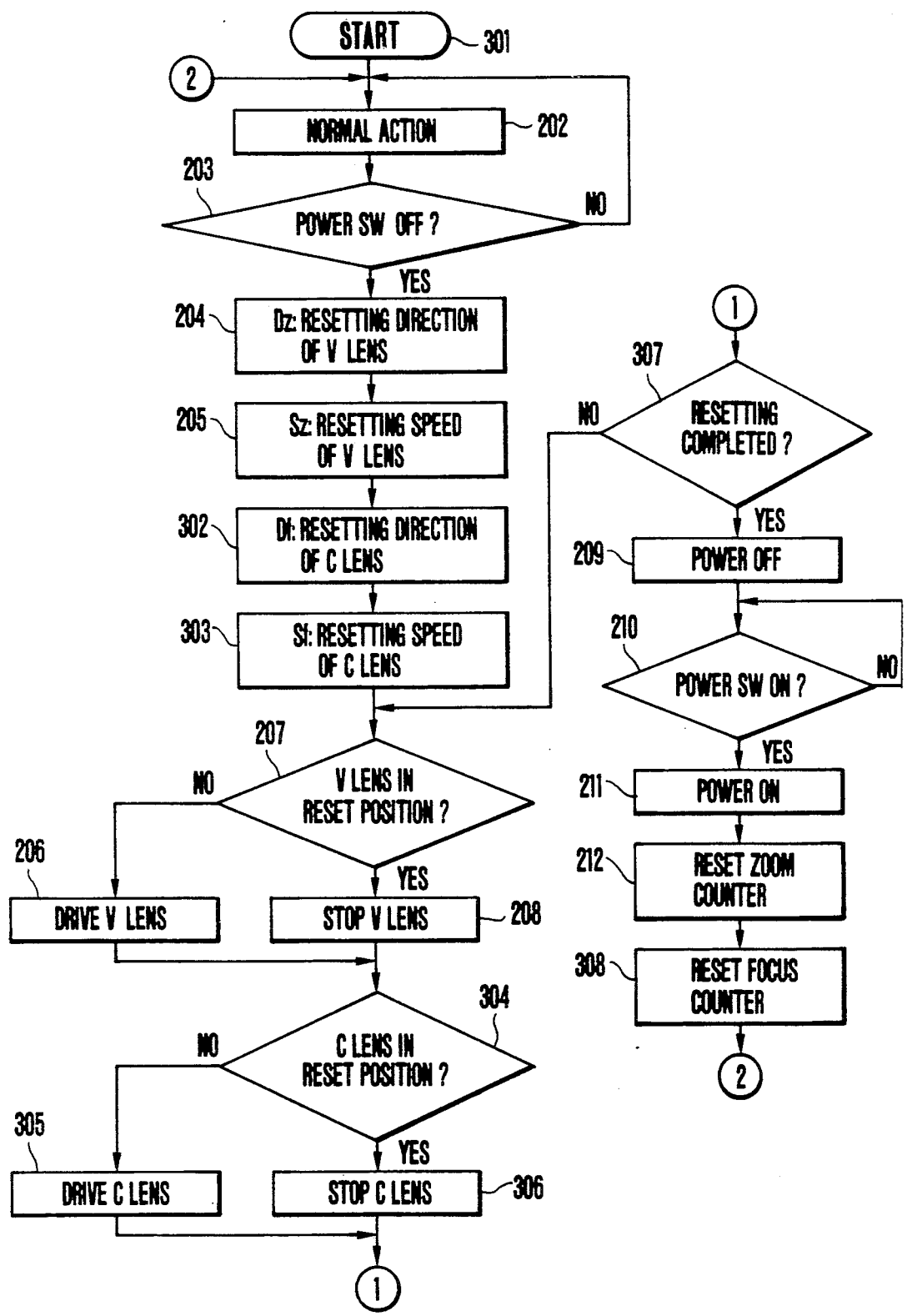
FIG. 8 is a flow chart showing the operation of the third embodiment.

Third Embodiment: FIG. 7 is a block diagram showing a third embodiment of the invention. FIG. 8 is a flow chart showing the operation of the third embodiment. In these figures, the parts which function in the same manner as those of FIGS. 5 and 6 are indicated by the same reference numerals.

Referring to FIG. 7, a detector 301 is arranged to detect whether or not the C lens 103 is in a given reference position. In the case of the third embodiment, a stepper motor which is not easily affected by the force of inertia and permits accurate control by a microcomputer is employed as the drive source for the C lens which is arranged to perform focus adjustment.

To control a driving action on the stepper motor 112 by the microcomputer 109, pulses of phase equal to the phase at which the stepper motor 112 is rotated can be supplied directly to a driver 115 from the microcomputer 109. Therefore, it is not necessary to provide any additional pulse generator at the V lens 102, if the increment and the decrement of the number of pulses are counted within the microcomputer 109. However, if the drive source 112 is not a stepper motor, a gear 117, a pulse generator 119 and a pulse detector 120 are indispensable.

The counter for the stepper motor must be reset immediately before commencement of a normal action in the same manner as in the case of the second embodiment.

FIG. 8 is flow chart showing the flow of a program provided within the microcomputer 109 to be executed by this (third) embodiment. In the flow chart, a step 301 is provided for the start of the program. A step 302 is provided for setting the shifting direction of the C lens 103 in the resetting direction. A step 303 is provided for setting a speed at which a resetting action is to be performed on the C lens 103. A step 304 is provided for checking the output of the detector 301 to see if the C lens 103 has reached the reset position. A step 305 is provided for driving the C lens 103. A step 306 is provided for bringing the C lens 103 to a stop. A step 307 is provided for confirming that both the V and C lenses 102 and 103 have been completely reset and are in repose. A step 308 is provided for setting the above-stated pulse motor driving pulse counter (hereinafter referred to as focus counter) at a value corresponding to the reset position. The details of the flow of the program are as described below with reference to FIG. 8.

Step 301: The program begins to be executed. Step 202: The normal actions of the camera are allowed to continue until a power (supply) switch is found to have been turned off at a step 203. Step 203: A check is made to see if the power switch has been turned off. If so, the flow comes to a step 204. Steps 204, 205, 302 and 303: The directions and apposite speeds for shifting the V and C lenses 102 and 103 to their reset positions are set. Step 207: A check is made to see if the V lens 102 has reached the reset position If not, the flow comes to a step 206. Step 206: The V lens is shifted at the speed set. If the V lens 102 is found to have reached the reset position at the step 207, the flow comes to a step 208. Step 208: The V lens is brought to a stop. Steps 304 to 306: The same checking and controlling actions are performed on the C lens 103. The steps 207 to 306 are repeatedly executed until both the reset actions on the two lenses are found to have been completed at a step 307.

Step 209: Upon completion of the reset actions on the lenses 102 and 103, the power supply is immediately cut off. Step 210: The flow waits for switching-on of the power supply. When the power switch is turned on, the flow comes immediately to a step 211. Step 211: The power supply is effected. Steps 212 and 308: The zoom and focus counters are set at values corresponding to the reset positions of the lenses 102 and 103 respectively. After that, the flow comes back to the step 202 for the normal camera actions.

The above-stated steps of the program enables the embodiment of the invention to reset both the counters which are provided for the V and C lenses.

The second and third embodiments described above are arranged to compulsively shift the lens, before the power supply is cut off, to a predetermined position where the counter comes to a predetermined value position. This arrangement enables the camera actions to immediately begin for shooting without any time lag when the power supply is turned on at the next time.

Figure 9:
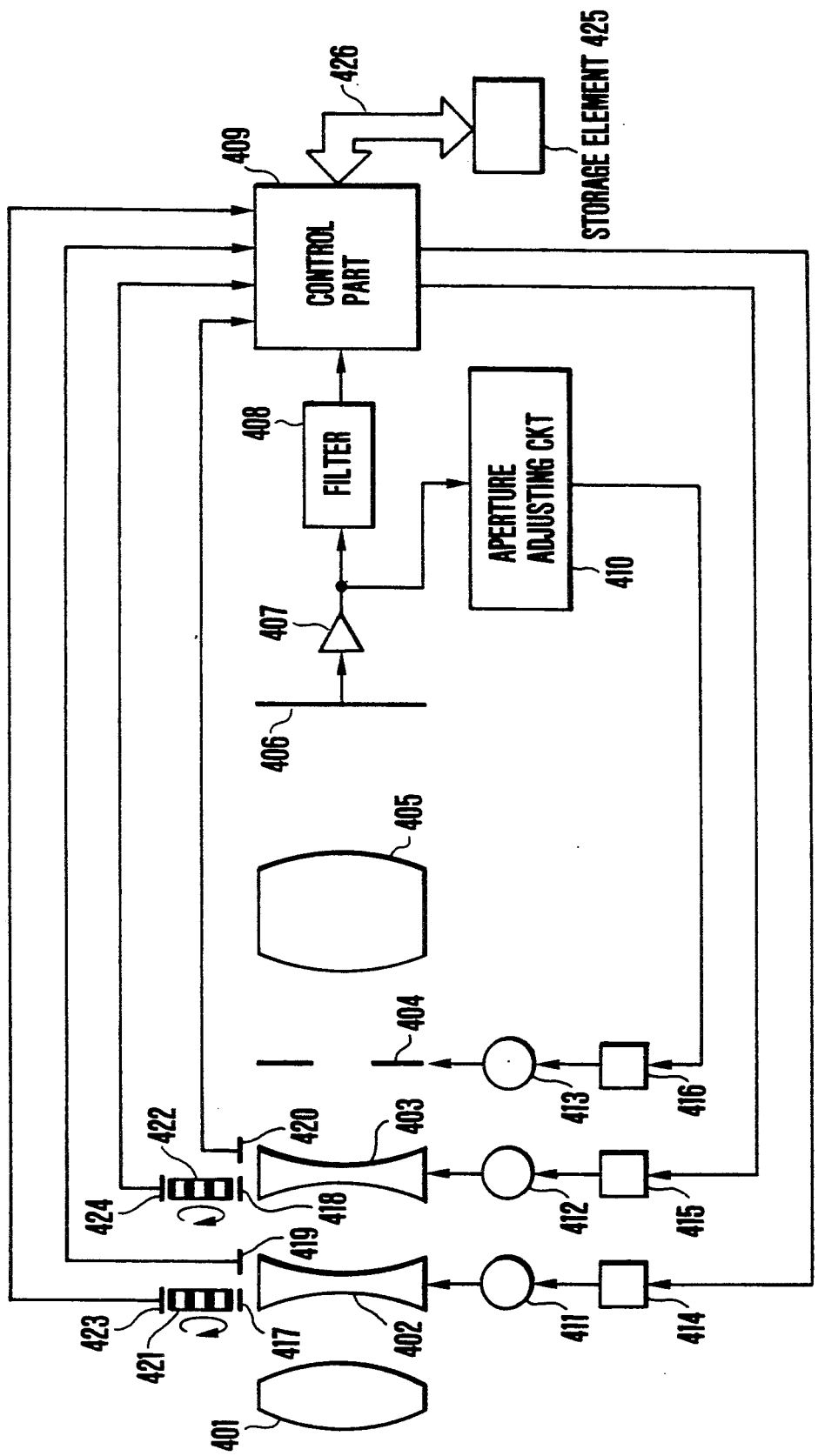
FIG. 9 is a block diagram showing a zoom lens position control device which is arranged according to the invention as a fourth embodiment thereof.

Fourth Embodiment: FIG. 9 shows in a block diagram a lens position control device for a zoom lens arranged as a fourth embodiment of the invention. Referring to FIG. 9, a first lens group 401 is arranged to be stationary. A second lens group 402 (hereinafter referred to as V lens) is provided for varying the magnifying power of the zoom lens. A third lens group 403 (hereinafter referred to as C lens) is arranged to correct a change occurring on a focal plane as a result of a change in the magnifying power and also to adjust the focal point of the lens. In conjunction with these lens groups, an iris 404 and an image forming lens group 405 form the zoom lens of a video camera. An image sensor which is composed of a CCD, etc. has an image sensing plane 406. An amplifying circuit 407 is arranged to amplify the output of the image sensing plane 406. A reference numeral 408 denotes a filter. A control part 409 is composed of a microcomputer and its peripheral circuits. An aperture adjusting circuit 410 is arranged to determine the luminance of an image formed on the image sensing plane 406 and to adjust it to a suitable value by adjusting the aperture of the iris 404. Drive sources 411, 412 and 413 are arranged to drive the V lens 402, the C lens 403 and the iris 404 respectively. Drivers 414, 415 and 416 are arranged to drive the drive sources 411, 412 and 413 respectively. Rings 417 and 418 are arranged to rotate accordingly as the V lens 402 and the C lens 403 are moved. Reset position detecting devices 419 and 420 are arranged to detect whether or not the V lens 402 and the C lens 403 are in their reset positions and to supply detection signals to the control part 409. Encoders 421 and 422 are arranged to rotate according to the rotation of the rings 417 and 418 and to produce pulse information respectively while they rotate. Lens position detecting devices 423 and 424 are arranged to detect the pulse information output from the encoders 421 and 422; to convert the information detected into electrical signals; and to supply the electrical signals to the control part 409 respectively. A storage element 425 is arranged to permit writing and reading. A bus 426 is arranged to permit communication of data and control signals between the control part 409 and the storage element 425.

Figure 10:
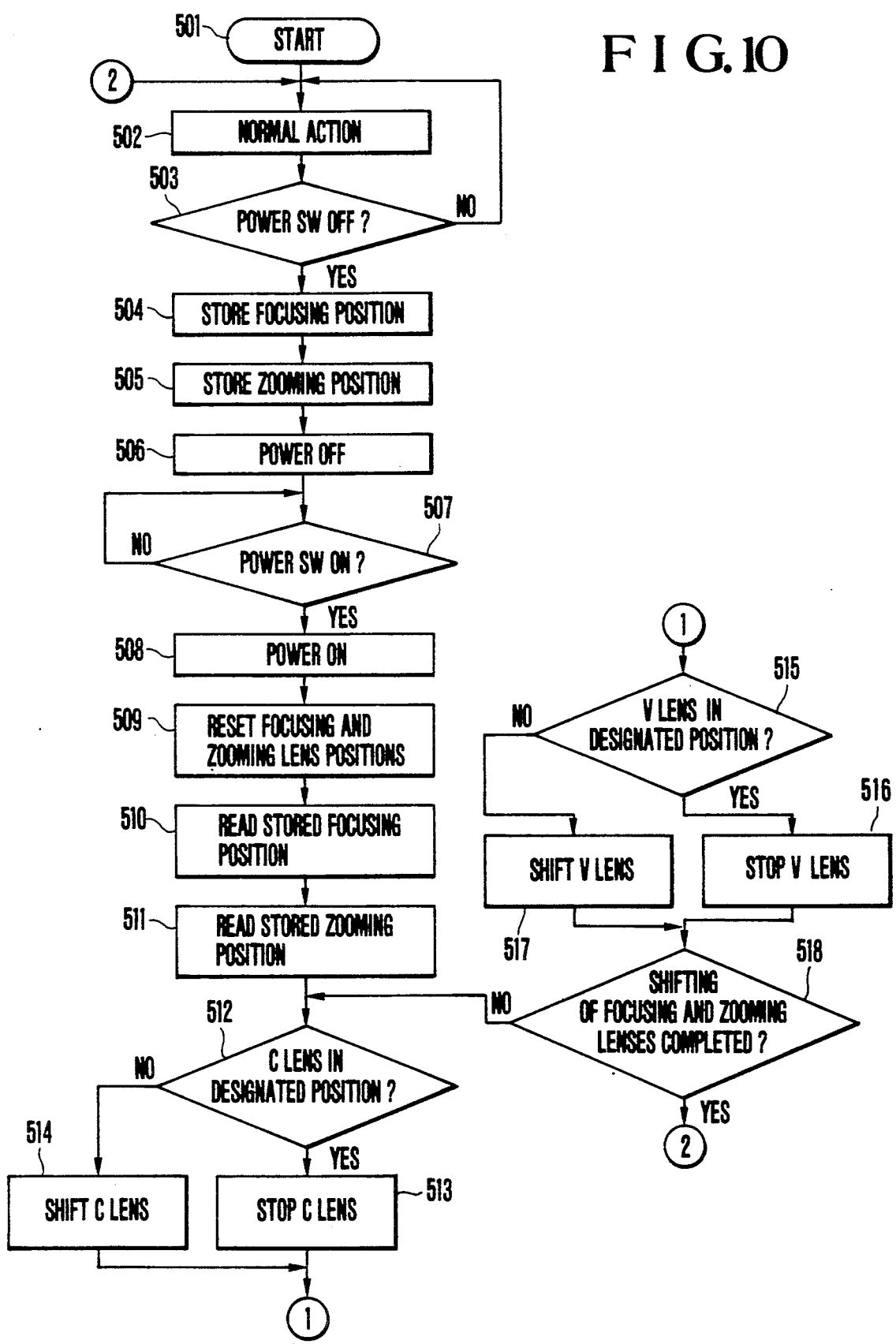
FIG. 10 is a flow chart showing the operation of the fourth embodiment.

FIG. 10 is a flow chart showing the flow of a program to be executed within the control part 409 for the purpose of controlling the position of the V lens 402 and that of the C lens 403. Referring to FIG. 10, the program begins at a step 501. A step 502 is provided for allowing the video camera to perform normal actions such as a power varying action, an automatic focus adjusting action, etc. A step 503 is provided for making a check to see if the power switch of the video camera has been turned off. A step 504 is provided for storing information on the position of the C lens 503 in the storage element 425. A step 505 is provided for storing information on the position of the V lens 402 in the storage element 425. A step 506 is provided for cutting the power supply off. A step 507 is provided for making a check to see if the power switch has been turned on. A step 509 is provided for shifting both the V and C lenses to their given reset positions and for resetting, at predetermined values, the counters of the control part 409 which are arranged to count the pulses output from the lens position detecting devices 423 and 424 respectively. A step 510 is provided for reading from the storage element 425 the information on the position of the C lens 403. A step 511 is provided for reading from the storage element 425 the information on the position of the V lens 402. A step 512 is provided for making a check to see if the C lens 403 has been moved to the position read out at the step 510. A step 513 is provided for bringing the movement of the C lens 403 to a stop. A step 514 is provided for moving the C lens 403 toward the position read out at the step 510. A step 515 is provided for making a check to see if the V lens 402 has been moved to the position read out at the step 511. A step 516 is provided for bringing the movement of the V lens 402 to a stop. A step 517 is provided for moving the V lens 402 toward the position read out at the step 511. A step 518 is provided for making a check to see if both the C and V lenses have been shifted to the positions stored at the steps 504 and 505. The following describes the operation of this (fourth) embodiment with reference to FIG. 10:

Step 501: The program starts. Step 502: The normal camera actions are allowed to be performed until confirmation of the fact that the power switch is turned off. Step 503: A check is made to see if the power switch has been turned off. If so, the flow comes to the step 504. Steps 504 and 505: The counted values of zoom and focus counters which are not shown but continuously count pulses output from the lens position detecting devices 423 and 424 during the normal camera actions are supplied via the bus 426 to the storage element 425 to be stored there. Upon completion of the storing action on the storage element 425, the flow comes to the step 506. Step 506: The power supply to circuits is cut off. Step 507: The flow waits until the power switch is turned on. Step 508: Upon confirmation that the power switch is turned on, the flow comes to the step 509. Step 509: Both the C (focusing) lens and the V (zooming) lens are moved to the given reset positions respectively. After it is confirmed that they have reached their reset positions, they are brought to a stop. Then, the above-stated zoom and focus counters are reset and the flow comes to the step 510. Steps 510 and 511: The information on the positions of the C and V lenses stored before the power supply is cut off is read out from the storage element 425. Step 512: A check is made to see if the C lens is in the position stored at the step 504. If not, the flow comes to the step 514. Step 514: The C lens is shifted toward the position stored at the step 504. If the C lens is found to have reached the position at the step 512, the flow comes to the step 513. Step 513: The C lens is brought to a stop. Steps 515 and 516: The same processes are performed for the V lens. Step 518: A check is made to see if both the shifting actions on the C and V lenses have been completed. If one of the shifting actions has not been completed, the flow comes back to the step 512 to repeat the same series of actions. When both the C and V lenses are shifted back to their positions stored at the steps 504 and 505, the flow of the program comes back to the step 502 to allow the ordinary camera actions to begin.

With the program executed in the above-stated manner, each of these lenses can be brought back to the lens positions obtained immediately before a reset action even when the reset action is performed.

Figure 11:
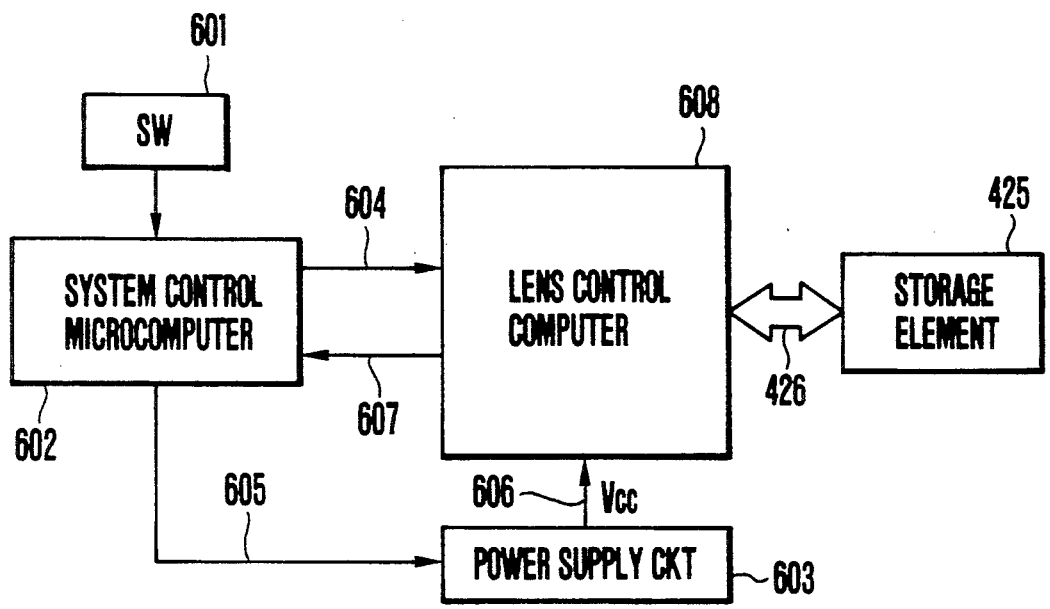
FIG. 11 is a block diagram showing the control part of the fourth embodiment.

In the case of the embodiment described above, the power supply is allowed to be cut off at the step 506 following the check made for the on-state of the power switch at the step 507 after the check made for the off-state of the power switch at the step 503. However, this process is not easily executable without having some arrangement to control the on- and off-states of the power supply outside the lens position controlling computer. In view of this, it has been practiced in many cases to have a power on/off control device disposed outside the lens controlling computer Hence, the control part 409 of the (fourth) embodiment is also arranged to include a power supply system in a manner as shown in FIG. 11 and as described below:

Referring to FIG. 11, the camera is provided with a power (supply) switch 601. A system control microcomputer 602 is arranged to control the whole system. A power supply circuit 603 is arranged to turn on and off the power supply in accordance with the instruction of the microcomputer 602. A transmission line 604 is arranged to transmit information on the state of the power switch 601 from the microcomputer 602 to the lens control computer 608. A transmission line 605 is provided for sending a control signal from the microcomputer 602 to the power supply circuit 603. A line 606 is provided for a power supply to the lens control computer 608. A transmission line 607 is provided for sending a power supply cutting-off signal from the lens control computer 608 to the system control microcomputer 602. When information on the off-state of the power switch 601 is sent from the microcomputer 602 to the lens control computer 608, the computer 608 allows the flow of the program to proceed from the step 503 to the step 504. After execution of the steps 504 and 505, the computer 608 sends to the system control microcomputer 602 via the transmission line 607 a signal which permits a cut-off action on the power supply. In response to this signal, the microcomputer 602 cuts off the output of the power supply circuit 603 through the transmission line 605.

When the power switch 601 is turned on at the next time, the microcomputer 602 first instructs the power supply circuit 603 via the line 605 to effect the power supply to the lens control computer 608. Then, the step 509 and ensuing steps of the program are executed by the lens control computer 608.

Further, the element which is employed as the storage element 425 is either an element such as $E^2PROM$ or the like that is capable of keeping the contents of storage non-volatile even after the power supply is cut off or a RAM which is arranged to continuously receive a power supply despite occurrence of the step 506. A RAM card or the like which is provided with a power supply and arranged to be removable may be employed as the storage element 425.

Figure 12:
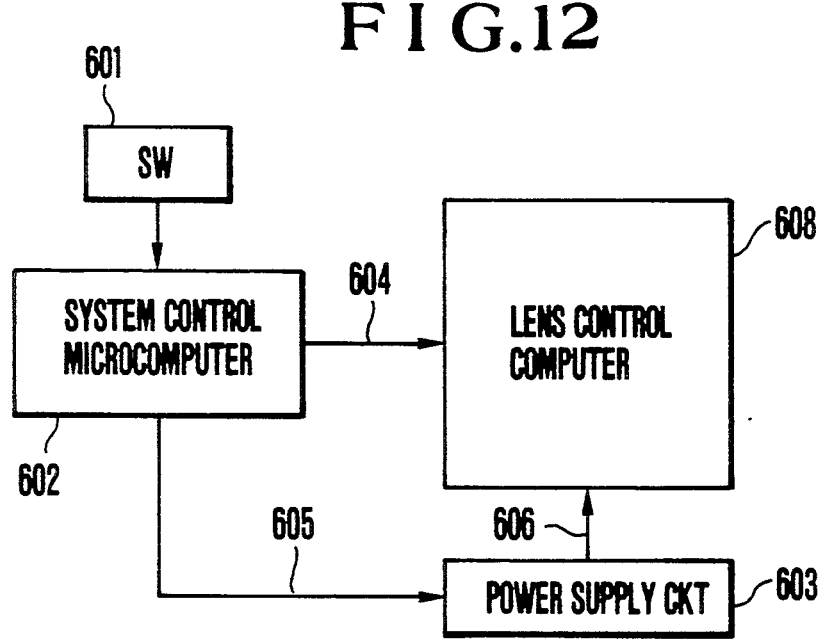
FIG. 12 is a block diagram showing the control part of a fifth embodiment of the invention.
Figure 13:
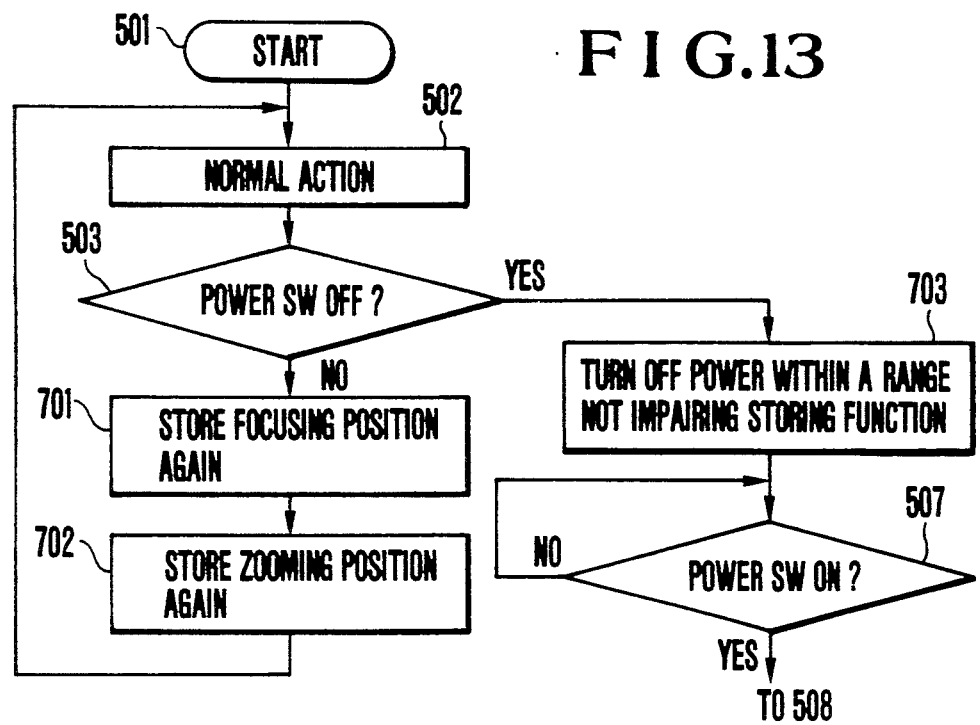
FIG. 13 is a flow chart showing the operation of the fifth embodiment.

Fifth Embodiment: FIG. 12 shows in a block diagram the control part of a fifth embodiment of the invention. FIG. 13 is a flow chart showing the operation of the fifth embodiment performed according to a program, wherein: Steps 701 and 702 are provided for causing the counted values of counters which are arranged to detect the positions of the C and V lenses to be stored in a RAM which is arranged to be used for lens control. A step 703 is provided for cutting off the power supply within the limit of not impairing the contents of the RAM. A step 507 and ensuring steps are arranged to execute the flow of the program in the same manner as the flow shown in FIG. 10.

In the fifth embodiment, a lens control computer 608 has two different operating modes. In one mode, computing and discriminating processes are performed in an ordinary manner (hereinafter referred to as a normal mode). In the other mode, the computer performs no action except retaining the storage contents of the RAM (hereinafter referred to as a stand-by mode). The computer is provided with an element for change-over between the two modes. Further, in this case, the storage element 425 of FIG. 9 is disposed within the computer 608.

Referring to FIG. 12, when a power switch 601 is in an on-state, a request for an operation in the normal mode is sent from microcomputer 602 to the lens control computer 608 via a transmission line 604. When the power switch 601 is turned off, a request for a stand-by mode operation is sent likewise from the microcomputer 602 to the lens control computer 608. The microcomputer 602 is arranged also to produce a power supply cut-off signal to a power supply circuit 603 requesting it to cut off the power supply only in a case where every element is to be reset including the RAM of the lens control computer 608. With the exception of this, the power supply to the lens control computer 608 is arranged not to be cut off by the normal mode change-over action of the power switch 601.

In this instance, the program which is shown in FIG. 13 is executed within the lens control computer 608 in a manner as described below with reference to FIG. 13:

Step 501: The program begins to be executed. At the steps 701 and 702: The counted values of counters used for detecting the positions of C and V lenses are continuously stored to renew the contents of the RAM until the power switch 601 is found to have been turned off at the step 503. When the switch 601 is found to have been turned off at the step 503, the flow comes to the step 703. Step 703: The mode of the computer is shifted to the stand-by mode. Electric energy is saved by stopping all the functions of the camera except the function of retaining the contents of the RAM. Next, when the power switch 601 is found to have been turned on again through the signal of the transmission line 604 at the step 507, the step 508 and ensuing steps of the program are executed in the same manner as in the case of the fourth embodiment described in the foregoing.

Sixth Embodiment: In the cases of the fourth and fifth embodiments described in the foregoing, the power supply is arranged to be cut off. However, this invention can be put to practice through similar processes even in cases where the reset action is to be performed by a camera of the kind having a so-called reset switch.

Figure 14:
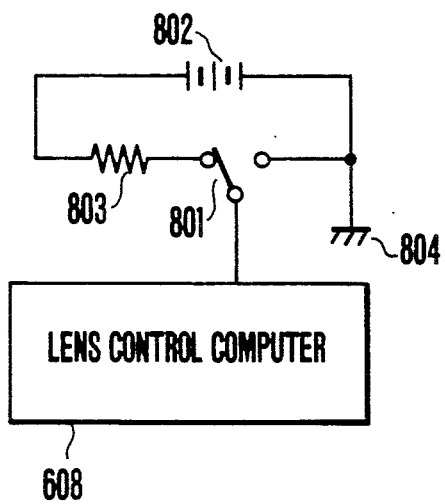
FIG. 14 is a block diagram showing the control part of a sixth embodiment of the invention.
Figure 15:
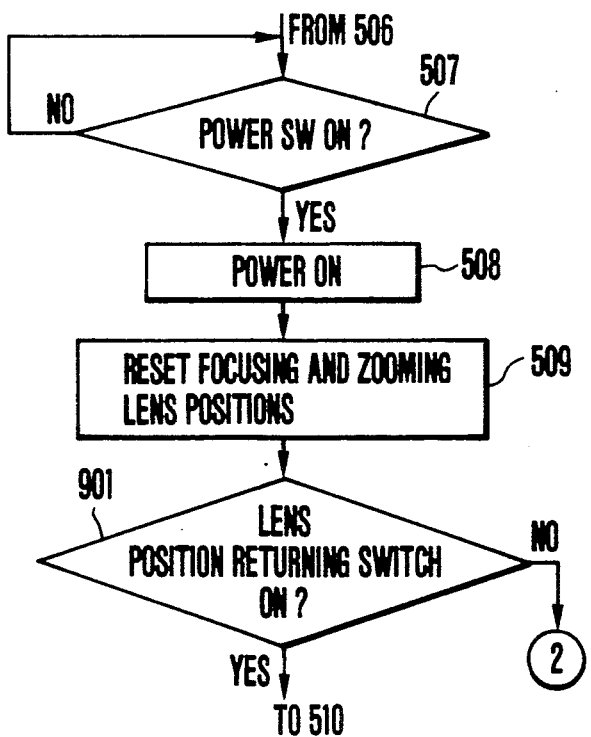
FIG. 15 is a flow chart showing the operation of the sixth embodiment.

FIG. 14 shows in a block diagram the control part of a sixth embodiment of the invention. FIG. 15 is a flow chart showing the operation of the control part. Referring to FIG. 14, the control part includes a lens position returning switch 801 which serves as the reset switch of the camera. A power source 802 is arranged to effect a power supply also to a lens control computer 608. The control part further includes a resistor 803. A reference numeral 804 denotes a grounding potential.

Referring to FIG. 15, the program of the control part includes a step 901 which is provided for reading the position of the lens position returning switch 801.

The sixth embodiment is provided with the switch 801 for making selection, after the reset action of fourth or fifth embodiment, as to whether or not the lens position is to be returned to the position obtained before the reset action. In the case of the sixth embodiment, this selection is made by inserting the step 901 in between the steps 509 and 510 shown in FIG. 10.

Referring again to FIG. 15, the above-stated reset action is carried out when the power supply is switched on at a step 508. After that, the output value of the switch 801 is read at the step 901. If the output of the switch 801 is at a high level, the lens position is returned back to the position obtained before the reset action with the step 510 and steps ensuing the step 510 executed. If the output of the switch 801 is found to be at a low level, the flow of the program comes back to the step 502 of FIG. 10. The output levels of the switch 801 which are used as the condition on which the selection or discrimination is made at the step 901 may be reversed.

The sixth embodiment enables the photographer to decide whether the lens is to be returned or not. This effectively obviates the necessity of a long stand-by period for unnecessary actions.

Each of the fourth, fifth and sixth embodiments is arranged to store information about the lens position obtained before the lens is shifted to the reset position and, after the reset action, to shift the lens back to the previous position the information on which is stored. An advantage of the arrangement resides in that the lens can be shifted back to the previous position without readjusting the lens position even when the reset action is performed while the camera is in operation.

It is another advantage of the sixth embodiment that the provision of the switch arranged to prevent the lens position returning action after the reset action effectively obviates the unnecessary waiting period otherwise required after the reset action.

What is claimed is:

1. An optical apparatus comprising:
    a) a first lens arranged to perform a magnifying power varying action;
    b) a second lens arranged to perform a focusing action and a compensating action which is required when the power varying action is performed;
    c) focus detecting means for detecting a focused state of an image;
    d) first control means for driving said second lens on the basis of information from said focus detecting means in such a way as to obtain an in-focus state;
    e) detecting means for detecting a state of said second lens; and
    f) second control means for enabling said detecting means to perform the detecting action thereof by driving said second lens into a normal focus adjustable state after driving said second lens to a reset state, said second control means being arranged to set a lens driving speed at which said second lens is to be driven from said reset state to said focus adjustable state at a higher speed than a driving speed set by said first control means.

2. An apparatus according to claim 1, wherein said first and second control means are arranged to drive said second lens in the direction of an optical axis.

3. An apparatus according to claim 2, wherein said first and second control means are arranged to drive said second lens in the direction of the optical axis by using a motor.

4. An apparatus according to claim 3, wherein said second control means is arranged to control the rotating speed of said motor.

5. An apparatus according to claim 2, wherein said detecting means is arranged to detect the position of said second lens.

6. An apparatus according to claim 5, wherein information on the position detected by said detecting means is obtained from an extent to which said second lens is moved from a reset position.

7. An apparatus according to claim 2, wherein said first control means is arranged to drive said second lens toward an in-focus position on the basis of information about the positions of said first and second lenses.

8. An apparatus according to claim 3, wherein said second control means is arranged to drive said second lens from a reset position toward an in-focus position on the basis of information about the positions of said first and second lenses.

9. An apparatus according to claim 8, further comprising third control means arranged to cause said second lens to be moved by said motor according to the movement of said first lens for the purpose of retaining an in-focus state.

10. An apparatus according to claim 9, wherein the rotating speed of said motor set by said second control means is faster than the rotating speed of said motor set by said third control means.

11. An apparatus according to claim 1, further comprising inhibiting means for inhibiting the magnifying power varying action of said first lens while said second lens is caused by said second control means to be driven from said reset state to said focus adjustable state.

12. An optical apparatus comprising;
a) a movable lens;
b) detecting means for detecting the present position of said movable lens, said detecting means being arranged to obtain information on the present position of said movable lens from an extent to which said movable lens is moved from a previously set position;
c) means for moving said movable lens from said present position of said movable lens to a reset position; and
d) control means for compulsively moving said movable lens to said reset position when the power supply of said optical apparatus is turned off.

13. An optical apparatus according to claim 12, wherein said movable lens is a lens arranged to vary a magnifying power.

14. An apparatus according to claim 13, including a further movable lens arranged to perform both a focus adjusting action and a compensating action required when a magnifying power is varied by said first-mentioned movable lens.

15. An apparatus according to claim 12, wherein said control means includes a microcomputer, and wherein said movable lens is moved to said reset position according to a program implemented by said microcomputer.

16. An optical apparatus comprising:
a) a movable lens movable to an operating position;
b) means for moving said movable lens to and from said operating position;
c) storing means for storing said operating position of said movable lens; and
d) control means for causing, after a resetting operation of said movable lens, said movable lens to be moved from a resetting position to said position stored by said storing means.

17. An apparatus according to claim 16, wherein said movable lens is a lens arranged to vary a magnifying power.

18. An apparatus according to claim 16, wherein said movable lens is a lens for focusing.

19. An apparatus according to claim 16, further comprising detecting means for the position of said movable lens, said detecting means being arranged to obtain information on the operating position f said movable lens from an extent to which said movable lens is moved from a reset position.

20. An apparatus according to claim 19, wherein said storing means is arranged to store information on said operating position obtained by said detecting means.

21. An apparatus according to claim 20, wherein said control means includes a microcomputer, and wherein said movable lens is moved and controlled according to a program implemented by said microcomputer.

22. An apparatus according to claim 21, wherein a nonvolatile memory is employed as said storing means.

23. An apparatus according to claim 16, wherein said storing means is arranged to store information on a position of said movable lens obtained immediately before a power supply is turned off.

24. An apparatus according to claim 23, wherein said control means is arranged to cause, when said power supply is turned on, said movable lens to be moved to said position stored by said storing means.

25. An apparatus according to claim 16, further comprising inhibiting means for inhibiting said control means from causing said movable lens to be moved to said operating position stored by said storing means.

* * * * *

UNITED STATES PATENT AND TRADEMARK OFFICE
CERTIFICATE OF CORRECTION

PATENT NO. : 5,144,491
DATED : September 1, 1992
INVENTOR(S) : Tatsuzo Ushiro, et al.

It is certified that error appears in the above-identified patent and that said Letters Patent is hereby corrected as shown below:

Col. 6, line 64.  Change "rest" to -- reset --
Col. 9, line 20.  Change "in" to -- of --
Col. 11, line 33. After "is" insert -- a --
Col. 18, line 33. After "for" insert -- detecting --
Col. 18, line 35. Change "f" to -- of --

Signed and Sealed this

Fourteenth Day of September, 1993

Attest:

BRUCE LEHMAN

*Attesting Officer*    *Commissioner of Patents and Trademarks*